United States Patent [19]

Braathen

[11] Patent Number: 4,545,604
[45] Date of Patent: Oct. 8, 1985

[54] CLAMP CONNECTOR FOR PIPES

[76] Inventor: Thor F. Braathen, 3358 N. Eggedal, Nedre, Norway

[21] Appl. No.: 523,568

[22] Filed: Aug. 16, 1983

[51] Int. Cl.$^4$ .............................................. F16L 25/00
[52] U.S. Cl. ..................................... 285/12; 285/156; 285/177; 285/250; 285/334.4
[58] Field of Search .................... 285/250, 343, 382.7, 285/177, 12, 423, 156, 334.4

[56] References Cited

U.S. PATENT DOCUMENTS 3,923,323  12/1975  Brogan ................................ 285/250

FOREIGN PATENT DOCUMENTS

| 2713978 | 10/1978 | Fed. Rep. of Germany | 285/4 |
| 1092535 | 11/1954 | France | |
| 2356868 | 1/1978 | France | 285/343 |
| 1175741 | 12/1969 | United Kingdom | |
| 1352445 | 5/1974 | United Kingdom | 285/343 |

OTHER PUBLICATIONS

Weatherhead Catalog, 10-8-48, E-402-A.

Primary Examiner—Cornelius J. Husar
Assistant Examiner—Eric K. Nicholson
Attorney, Agent, or Firm—Holman & Stern

[57] ABSTRACT

A clamp connector for pipes, of a type for use in a water service line, comprising a connector housing (1) having internal threads (2) for engagement with a clamping nut (3) having external threads (4) and a conical portion (5) extending axially from the threads (4) intended to engage with the base (6) of the connector housing, the leading portion of the cone (5) being intended, when the clamping nut (3) is tightened, to be pressed into sealing and retaining engagement with a pipe (7). The base (6) of the connector housing has two conical portions (9,11) separated by a cylindrical section (12) the two conical portions (9,11) being intended to engage with two clamping nuts (3) having different orifices corresponding to a different size outside diameters of the pipes that are to be coupled to the connector housing (1). The clamp connector can thus be used to connect pipes having different outside diameters in a tee-connector.

Transition member (13) whose external configuration corresponds to the clamping nut (3) and whose internal configuration corresponds at least in part to the housing (1), together with a clamping nut (3) of suitable dimensions for being screwed into the transition (13), is provided for connecting a pipe of smaller dimensions than other pipes coupled to the connector housing (1).

3 Claims, 1 Drawing Figure

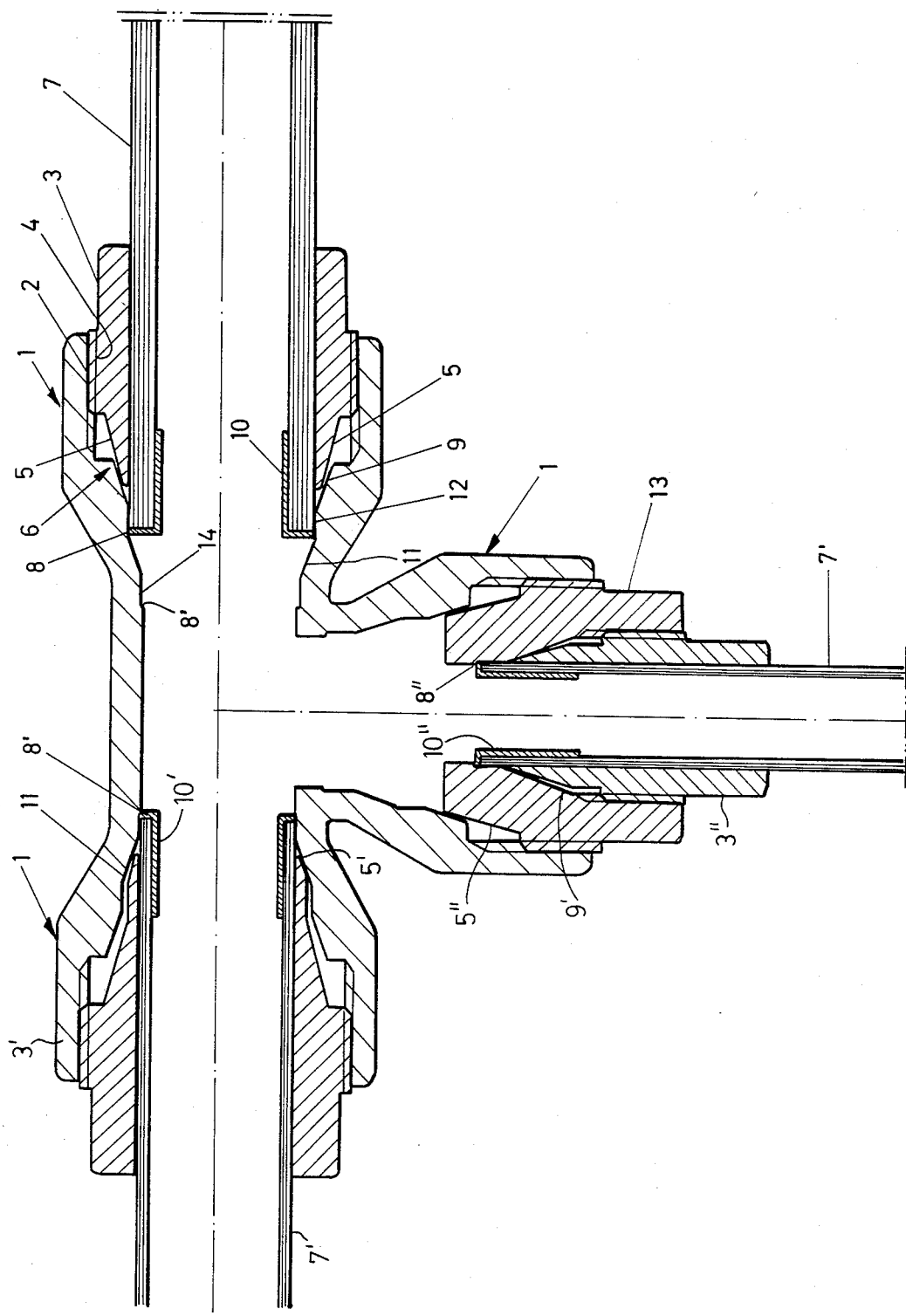

CLAMP CONNECTOR FOR PIPES

BACKGROUND OF THE INVENTION

The present invention relates to a clamp connector for pipes, for example a tape for use in a water service line. The type recited in the preamble of the appurtenant independent patent claim.

DESCRIPTION OF THE PRIOR ART

Clamp connectors of this general type are described in the prior art; see, for example, West German Pat. No. 27 13 978, British Pat. No. 1,175,741 and French Pat. No. 1,092,535.

In the clamp connectors disclosed in the first two references, both the conical portion of the clamping nut and the pipe that is coupled to the connector housing become very highly deformed. This makes it difficult subsequently to disconnect the coupling from the pipe, because the nut, owing to the mutual deformation of nut and pipe, will exert pull on the pipe, causing the pipe to follow the axial movement of the nut as it is being unscrewed; moreover, the pipe is sometimes mounted so that it cannot be moved axially. If a pipe coupled to the clamp connector is to be replaced by a different pipe, this will require replacing the clamping nut as well, because its conical portion has become so deformed that it cannot be used to connect a new pipe to the coupling.

The above drawback is overcome in the clamp connector disclosed in the French Pat. No. 1,092,535.

BRIEF SUMMARY OF THE INVENTION

The object of the present invention is to provide a clamp connector which in addition to permitting repeated disconnection of the coupling to facilitate replacement of pipes, also enables one to connect pipes of different outside diameter dimensions to the same connector housing, using clamping nuts of different orifice diameters which correspond to the outside diameter of the pipes in question.

BRIEF DESCRIPTION OF THE DRAWING

Now with reference to the accompanying drawing of an exemplary embodiment of the invention, showing a pipe tee having three connector housings coupled to pipes of different outside diameters.

DETAILED DESCRIPTION

The drawing shows a pipe tee having three identical housings 1 with internal threads 2 for engagement with a clamping nut 3 having external threads 4 and a conical portion 5 extending axially from the threads 4, intended for engagement with a conical portion 9 formed at the base 6 of the connector housing, wherein the diameter of the leading end of the cone 5 is smaller than the diameter of the opening defined by the conical portion 9 at its widest point. This is shown in connection with the housing 1 at the upper right-hand section of the figure. An 18×2.5 mm plastic pipe 7, i.e., 18 mm o.d. and 2.5 mm wall thickness (drawing scale: 2:1) is inserted into the clamp connector. The plastic pipe 7 with a support sleeve 10 at the end thereof is pushed into contact against an abutment 8 at the base 6 of the connector housing 1, which in the present case constitutes the widest point of an opening defined by a conical portion 11 lying internally of said conical portion 9. The conical portion 11 terminates in a cylindrical portion 14 having a shoulder 8' that forms an abutment for a pipe having a smaller outside diameter than the plastic pipe, for example, a 15×1.2 mm copper pipe, as shown in the connector housing at the upper left-hand section of the drawing.

It may be seen from the drawing that the outside diameters of the respective pipes correspond to the orifices of the clamping nuts 3, and that the diameter of a cylindrical portion 12 at the base 6 of the connector housing and the diameter of the cylindrical portion 14 also correspond to the respective outside diameters of the pipes. This is to ensure proper centering of the pipes when they are inserted into the clamp connector. After the respective pipes 7 have been inserted into the clamp connector, passing through the clamping nut 3 to abut against the annular abutments 8,8', the clamping nut 3 is screwed inwardly so that the leading end of its conical portion 5 engages with the conical portions 9 and 11 respectively on the housing, the angle of taper of the cone 5 being smaller than the angle of taper of the conical portions 9,11. When the clamping nut 3 is tightened further, the leading end of the cone 5 will be compressed by the conical portions 8 and 11 respectively, forcing it into sealing and retaining engagement with the pipe 7, whereas the pipe 7 is supported by the support sleeve 10 to prevent it from becoming deformed.

Owing to the good fit between the outside diameter of the pipe 7 and the orifice of the clamping nut 3, only minimal compression or deformation of the leading end of the cone 5 on the clamping nut 3 is necessary in order for the nut to seal against and retain the pipe 7. The cone 5 may only undergo plastic deformation, so that when the clamp connector is unscrewed, the end of the cone will revert to its original shape, releasing the pipe 7 which can then be easily withdrawn and replaced by a new pipe, if desired, and the clamping nut 3 can be re-used with the new pipe.

The coupling operation described for the pipe and clamp connector in the foregoing discussion is the same for the clamp connector shown in the upper left-hand section of the drawing. The only difference between this clamp connector and that at the upper right-hand section is that in the left-hand section of the drawing, the clamping nut 3' has a smaller orifice adapted for use with a copper pipe 7 having a smaller outside diameter than the plastic pipe on the right-hand side. In this case, the cone 5' of the clamping nut 3' must have a longer, slimmer configuration in order to extend forward to the innermost conical portion 11 at the base 6 of the housing 1.

To permit coupling an even smaller pipe to the pipe as shown at the lower portion of the drawing tee, for example, a 10×1 mm copper pipe, a transition member 13 is used whose external configuration is identical to that of the clamping nut 3, enabling it to be screwed into the housing 1 for establishing sealing contact between the cone 5 and the conical housing portion 9. The internal configuration of the transition member 13 is identical to at least part of the internal configuration of the housing 1, but it is of smaller dimensions; i.e., it may have either one conical portion 9' or two conical portions corresponding to 9,11, in the latter instance for the purpose of coupling two pipes of different outside dimensions, as explained above in connection with the clamp connectors shown at the upper right and left portions of the drawing. The pipe 7" with its supporting sleeve 10" is inserted into the clamping nut 3" for contact against the abutment 8" and the clamping nut 3' is then tightened, in the same manner as explained above.

Thus, using only five parts—a pipe tee having three connector housings 1, three different clamping nuts 3, 3', 3" and a transition member 13—it is possible to connect pipes of three different dimensions—namely, an 18×2.5 mm plastic pipe, a 15×1.2 mm copper pipe and a 10×1 mm copper pipe—to the same connector housing. This arrangement permits different types of pipes to be coupled in any combination desired using a minimum number of separate parts, requiring no more than five parts for pipes ranging from 10 to 18 mm in diameter.

I claim:

1. In a clamp connector for pipes, wherein a housing has at least one end with internal threads to be connected to a pipe, a base, a frusto-conical portion situated internally of the threaded portion adapted for engagement with a clamping nut having external threads and a frusto-conical portion extending axially from the external threaded portion, a leading end of the latter frusto-conical portion being pressed into sealing and retaining engagement with a pipe inserted through the nut into the clamp connector and into contact with an abutment at the base of the housing when said nut is tightened by the threads through interengagement of the frusto-conical portions, the clamping nut having an orifice corresponding to the outside diameter of the pipe, and the angle of taper of the frusto-conical portion of the clamping nut being smaller than the angle of taper of the frusto-conical portion on the connector housing, wherein the diameter of the clamping nut orifice is the same as the minimum diameter of the opening defined by the frusto-conical portion, the improvement wherein each connector end further comprises a second conical portion in said housing axially internally of said first mentioned frusto-conical portion, a second abutment axially internally of said second frusto-conical portion, the maximum diameter of said second frusto-conical portion being substantially the same as the minimum diameter of said first frusto-conical portion, a cylindrical portion in said housing defining an opening between said frusto-conical portions having a diameter substantially the same as said minimum diameter of said first frusto-conical portion, a second clamping nut interchangeable with said first clamping nut, an orifice in said second clamping nut having a diameter corresponding to the outer diameter of a second pipe smaller than the first mentioned pipe, the minimum diameter of said second frusto-conical portion being substantially the same as the diameter of the orifice of said second clamping nut, so that said connectors can be used for pipes having two different outside diameters.

2. A connector as claimed in claim 1 having a plurality of said threaded connector ends wherein said connector ends are the same size; and said second clamping nut is engageable with a second threaded pipe connector end so that two pipes of different outside diameter can be connected together by said connector.

3. A connector as claimed in claim 1 having three threaded pipe connector ends to form a pipe tee wherein, said connector ends are the same size, said second clamping nut is engageable in a second threaded end, and further comprising an intermediate nut engageable in a third threaded end having the same external portions with the same dimensions as the first mentioned clamping nut, an internal screw thread in the outer end of said intermediate nut, an internal frusto-conical portion situated axially inwardly of said internal screw thread having its larger base nearer said internal screw thread, a third clamping nut, an external thread on said third clamping nut respectively engageable with said internal thread, a frusto-conical portion extending axially inwardly from said external thread with its smaller diameter base at the inner end of said third nut, an axial bore through said third nut corresponding in diameter to the outer diameter of a third pipe of different size than the first and second pipes, the angle of taper of said frusto-conical portion of said third clamping nut being smaller than the angle of taper of said internal frusto-conical portion on said intermediate nut so that when said third clamping nut is tightened the inner end thereof is pressed radially inwardly into sealing and retaining engagement with a third pipe inserted through said axial bore in said third nut by interengagement of the respective frusto-conical portions, an internal cylindrical section on said intermediate nut extending axially inwardly from said frusto-conical portion on said intermediate nut having a diameter equal to the diameter of said axial bore in said third nut, and an internal shoulder extending radially inwardly from said internal cylindrical section to receive in abutting relationship the inner end of a third pipe inserted through said third clamping nut, said nuts having dimensions of relative sizes so that said pipe connector can be used for pipes having three different outside diameters.

* * * * *